(12) United States Patent
Keihany et al.

(10) Patent No.: US 11,713,662 B2
(45) Date of Patent: **\*Aug. 1, 2023**

(54) MODULAR SYSTEM AND MANIFOLDS FOR INTRODUCING FLUIDS INTO A WELL

(71) Applicant: FMC Technologies, Inc., Houston, TX (US)

(72) Inventors: Julian Keihany, Houston, TX (US); Corey Massey, Houston, TX (US)

(73) Assignee: FMC Technologies, Inc., Houston, TX (US)

( \* ) Notice: Subject to any disclaimer, the term of this patent is extended or adjusted under 35 U.S.C. 154(b) by 112 days.

This patent is subject to a terminal disclaimer.

(21) Appl. No.: 17/104,653

(22) Filed: Nov. 25, 2020

(65) Prior Publication Data

US 2021/0079775 A1 Mar. 18, 2021

Related U.S. Application Data

(63) Continuation of application No. 15/616,361, filed on Jun. 7, 2017, now Pat. No. 10,871,059.

(60) Provisional application No. 62/457,025, filed on Feb. 9, 2017.

(51) Int. Cl.
*E21B 43/26* (2006.01)
*F16L 41/03* (2006.01)
*F16L 3/00* (2006.01)
*E21B 33/068* (2006.01)

(52) U.S. Cl.
CPC ............ *E21B 43/26* (2013.01); *E21B 33/068* (2013.01); *F16L 3/00* (2013.01); *F16L 41/03* (2013.01)

(58) Field of Classification Search
CPC .......... E21B 43/26; E21B 33/068; F16L 3/00; F16L 41/03
See application file for complete search history.

(56) References Cited

U.S. PATENT DOCUMENTS

| 2014/0277772 | A1* | 9/2014 | Lopez | ..................... E21B 43/26 700/282 |
| 2015/0000766 | A1* | 1/2015 | Arizpe | .................. F16L 55/035 137/561 A |

\* cited by examiner

*Primary Examiner* — Dany E Akakpo
(74) *Attorney, Agent, or Firm* — Osha Bergman Watanabe & Burton LLP

(57) ABSTRACT

An illustrative modular manifold disclosed herein includes, among other things, a low-pressure manifold comprising a frac fluid outlet valve, wherein a fracturing fluid is adapted to be supplied from the low-pressure manifold via the frac fluid outlet valve to a suction side of a frac pump, and a high-pressure manifold comprising at least one frac fluid inlet valve, wherein the high-pressure manifold is adapted to receive, via the frac fluid inlet valve, a fracturing fluid discharged from the frac pump. In this example, the modular manifold also includes a support structure for mechanically supporting the low- and high-pressure manifolds and a plurality of height-adjustable support legs operatively coupled to the support structure.

18 Claims, 8 Drawing Sheets

MODULAR SYSTEM AND MANIFOLDS FOR INTRODUCING FLUIDS INTO A WELL

TECHNICAL FIELD

Generally, the present disclosure relates to a modular system and manifolds for introducing fluids into a well. In one example, the modular system and manifolds disclosed herein may be used in performing fracturing operations on oil and gas wells.

BACKGROUND

Successful oil and gas wells are formed by drilling a hole into a geological formation where hydrocarbons (oil and/or gas) are present. In some cases, the production of hydrocarbons from an existing well may decrease over time and various actions are undertaken to increase the production from the well. For example, a hydraulic fracturing process (also known as a "fracing" operation) may be performed on the well in an effort to increase the production of hydrocarbon fluids. In other cases, fracturing operations may be performed on brand new wells. For example, fracturing operations may be performed on brand new wells that extend very deep (e.g., 10,000-20,000 feet) into the earth since, at such depths, the formation may not exhibit sufficient permeability and porosity to allow oil and gas to flow naturally from the formation into the well at rates sufficient to economically justify drilling the well.

In general, hydraulic fracturing operations involve pumping a fracturing fluid under high pressure into the formation for purposes of creating cracks in the formation to thereby create fluid flow paths from the well to a larger area of the reservoir that contains the hydrocarbons to be produced. More specifically, a hydraulic fracture is formed by pumping a fracturing fluid into the well at a rate sufficient to increase the pressure downhole to a value that is greater than the fracture gradient of the formation. The pressure of the fracturing fluid cause the formation to crack, thereby allowing the fracturing fluid to enter and extend the crack further into the formation. In some cases, depending upon the application, the cracks formed during such a fracturing operation may radiate a great distance away from the well and into the formation. The fracturing fluid can comprise any type of fluid, ranging from water to gels, foams, nitrogen, carbon dioxide, or air in some cases along with different forms of diluted acid. To keep the fractures in the formation open after the fracture is initially formed, so-called propping agents or "proppants" (typically small spheres generally composed of quartz sand grains, ceramic spheres or aluminum oxide pellets) are introduced into the fracturing fluid and pumped into the fractures to extend the fractures and pack them with proppants. At a very basic level, the proppants act to keep the fracture "propped" open when the pressure on the fracturing fluid is eliminated or reduced. Typically, the proppant is made of a material that is higher in permeability than the surrounding formation. Accordingly, the propped hydraulic fracture becomes a high permeability conduit through which the formation fluids can flow into the well.

FIG. 1 depicts an illustrative example of various items of equipment that are typically part of an illustrative prior art fracturing system 10 used in fracturing operations and also depicts one illustrative example of how such fracturing equipment may be arranged and positioned on-site when performing a fracturing operation. In general, the equipment used in hydraulic fracturing operations includes, among other things, a blender 12, a plurality of water tanks 14, a plurality of proppant or sand containers 16, a data monitoring van 18, a frac manifold 20, a plurality of trucks 22 each of which has a high-pressure frac pump 24 and a plurality of high-pressure fluid flow lines 26. In the depicted example, there are a total of twelve such trucks 22—six on each side of the manifold 20. In operation, the blender 12 is adapted to prepare or mix the fracturing fluid to be injected into the formation. The blender 12 may receive water from the water tanks 14 and various chemical additive and/or proppants/sand from the containers 16 and mix all of these materials together. The final fracturing fluid is provided from the blender 12 to the low-pressure inlet side of the frac pumps 24 via various low-pressure flow lines (not shown). The frac pumps 24 are operated so as to generate a high-pressure fracturing fluid that is injected into the manifold 20 via various high-pressure flow lines 26. The high-pressure fracturing fluid flows from the manifold 20 to the well 28 where it is ultimately injected into the formation. The data-monitoring van 18 comprises equipment and sensors that enable personnel to monitor the fracturing process.

In general, fracturing equipment is designed and sized such that it may fit within the footprint (or area) of a flatbed trailer of the trucks 22 so as to facilitate transportation of the fracturing equipment to the job site. For example, the manifold 20 is sized and configured to fit on top of a flatbed trailer. The flatbed trailer, with the manifold 20 positioned thereon, is then positioned (more or less) at a relatively central location with respect to where all of the other fracturing equipment will be located at the job site. That is, in its operating position, the manifold 20 is located on a flatbed trailer whose upper surface is approximately 4 feet or so above the surface of the ground. The trucks 22 are positioned as close to the manifold 20 as is reasonably possible. However, due to the number of trucks 22 involved in a typical fracturing process, and the space occupied by such trucks, some of the trucks 22 are necessarily located a greater distance away from the manifold 20 than are other trucks 22. Obviously, the pumps 24 must be in fluid communication with the manifold 20. This fluid communication is typically achieved by the use of various high-pressure hoses 26 (and/or high-pressure piping). As a matter of convenience and practicality, the length of the hoses 26 is normally selected such that they may be used to couple the pump 24 on the most distant truck 22 to the manifold 20. Additionally, these hoses 26 typically rest on the ground, which can be problematic for several reasons. The lengths of the hoses 26 can be even more problematic for the trucks 22 that are positioned closer to the manifold 20 as the excess length of the hoses 26 creates an even greater amount of hosing that is lying on the ground between the trucks 22 and the manifold 20. All of these hoses 26 positioned on the ground must be avoided by personnel working on-site during a fracturing operation and can make it more difficult to perform necessary corrective actions on the fracturing equipment during a fracturing operation, such as, replacing a damaged or leaking hose 26. Additionally, the positioning of the manifold 20 on top of a trailer of a truck 22, i.e., above ground level, can make it more difficult for workers to readily access the manifold 20 when needed during fracturing operations.

The present disclosure is directed to a modular system and manifolds for use in introducing fluids into a well, such as, performing fracturing operations on oil and gas wells that may solve or at least reduce the effects of one or more of the problems identified above.

SUMMARY

The following presents a simplified summary of the subject matter disclosed herein in order to provide a basic understanding of some aspects of the information set forth herein. This summary is not an exhaustive overview of the disclosed subject matter. It is not intended to identify key or critical elements of the disclosed subject matter or to delineate the scope of various embodiments disclosed herein. Its sole purpose is to present some concepts in a simplified form as a prelude to the more detailed description that is discussed later.

Generally, the present disclosure is directed to a modular system and manifolds for use in introducing fluids into oil and gas wells. One illustrative modular manifold disclosed herein includes, among other things, a low-pressure manifold comprising a frac fluid outlet valve, wherein a fracturing fluid is adapted to be supplied from the low-pressure manifold via the frac fluid outlet valve to a suction side of a frac pump and a high-pressure manifold comprising at least one frac fluid inlet valve, wherein the high-pressure manifold is adapted to receive, via the frac fluid inlet valve, a fracturing fluid discharged from the frac pump. In this example, the modular manifold also includes a support structure for mechanically supporting the low-pressure manifold and the high-pressure manifold and a plurality of height-adjustable support legs operatively coupled to the support structure.

Another illustrative modular manifold disclosed herein includes, among other things, a high-pressure manifold comprising at least one frac fluid inlet valve, wherein the high-pressure manifold is adapted to receive, via the at least one frac fluid inlet valve, a fracturing fluid discharged from at least one frac pump that is operatively coupled to the high-pressure manifold, a dedicated and independent low-pressure manifold comprising at least one frac fluid outlet valve, wherein a low-pressure fracturing fluid is adapted to be supplied from the dedicated and independent low-pressure manifold, via the at least one frac fluid outlet valve, only to the at least one frac pump that is operatively coupled to the high-pressure manifold, and a support structure for mechanically supporting the dedicated and independent low-pressure manifold and the high-pressure manifold.

One illustrative system disclosed herein includes, among other things, first, second and third modular manifolds that are laterally spaced apart from one another, a first connecting manifold spacing spool that is operatively coupled to the first and second modular manifolds, the first connecting manifold spacing spool having a first axial length, and a second connecting manifold spacing spool that is operatively coupled to the second and third modular manifolds, the second connecting manifold spacing spool having a second axial length that is different than the first axial length.

Also disclosed herein is a method of designing a first modular manifold system and a second modular manifold system, wherein the first modular manifold system has a first overall system length and the second modular manifold system has a second overall system length that is different from the first overall system length. In one example, the method includes selecting a first plurality of modular manifolds to be included as part of the first modular manifold system, wherein laterally adjacent modular manifolds of the first plurality of modular manifolds are adapted to be operatively coupled to one another by one of a first plurality of manifold spacing spools for the first manifold system, and selecting a first axial length for each of the first plurality of manifold spacing spools such that the first modular manifold system has the first overall system length. In this example, the method also includes selecting a second plurality of modular manifolds to be included as part of the second modular manifold system, wherein laterally adjacent modular manifolds of the second plurality of modular manifolds are adapted to be operatively coupled to one another by one of a second plurality of manifold spacing spools for the second manifold system, and selecting a second axial length for each of the second plurality of manifold spacing spools such that the second modular manifold system has the second overall system length that is different from the first overall system length. In the example disclosed herein, the first and second plurality of modular manifolds each comprises a low-pressure manifold, a high-pressure manifold and a support structure for mechanically supporting the low-pressure manifold and the high-pressure manifold.

BRIEF DESCRIPTION OF THE DRAWINGS

Certain aspects of the presently disclosed subject matter will be described with reference to the accompanying drawings, which are representative and schematic in nature and are not be considered to be limiting in any respect as it relates to the scope of the subject matter disclosed herein:

FIG. 6 is a perspective view of the illustrative modular manifold structure shown in

FIG. 5;

Figure 1:
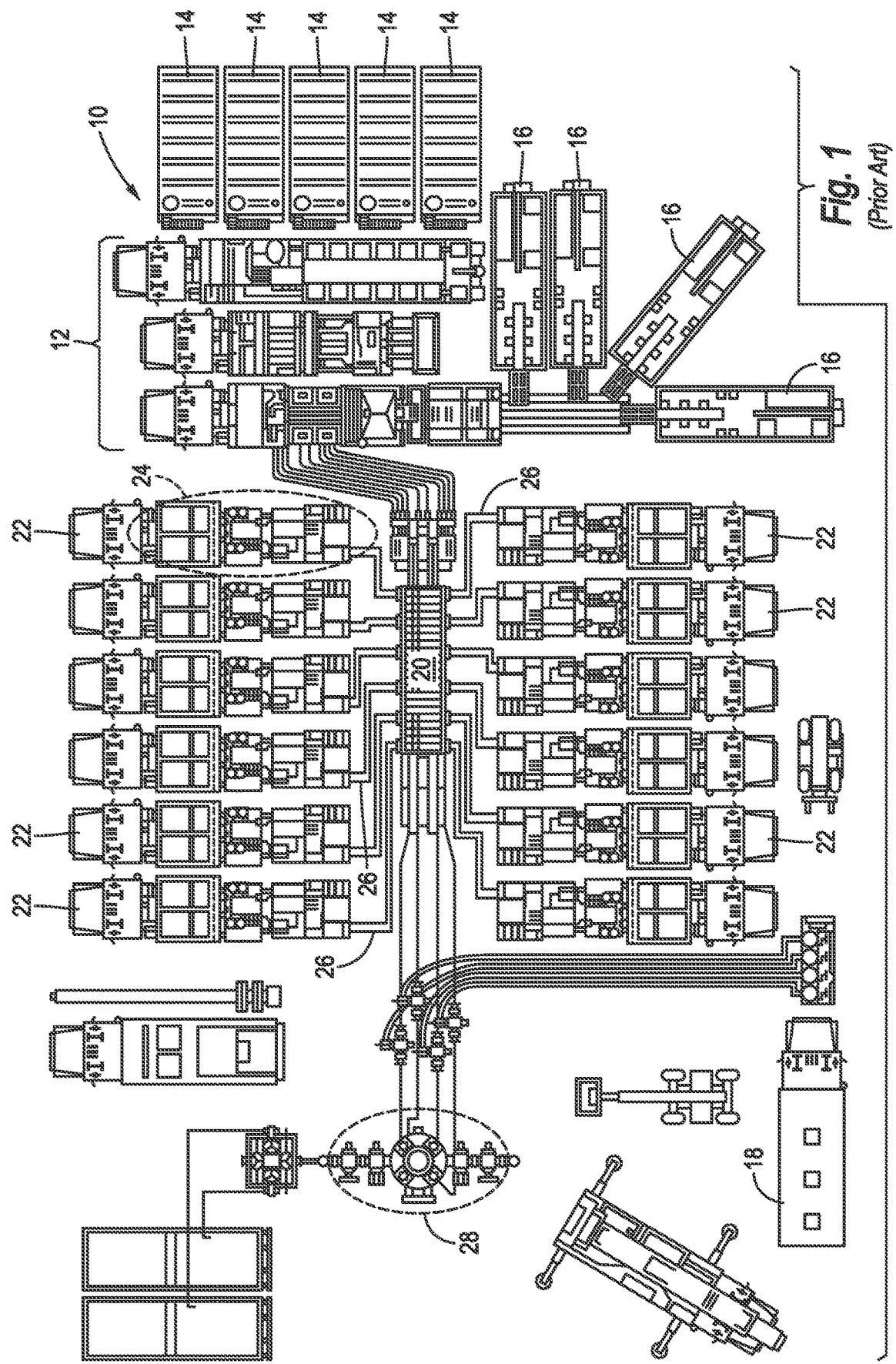
FIG. 1 simplistically depicts an illustrative prior art fracturing system.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DESCRIPTION OF EMBODIMENTS

Various illustrative embodiments of the disclosed subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. With reference to the attached figures, various illustrative embodiments of the systems, devices and method disclosed herein will now be described in more detail.

Figure 2:
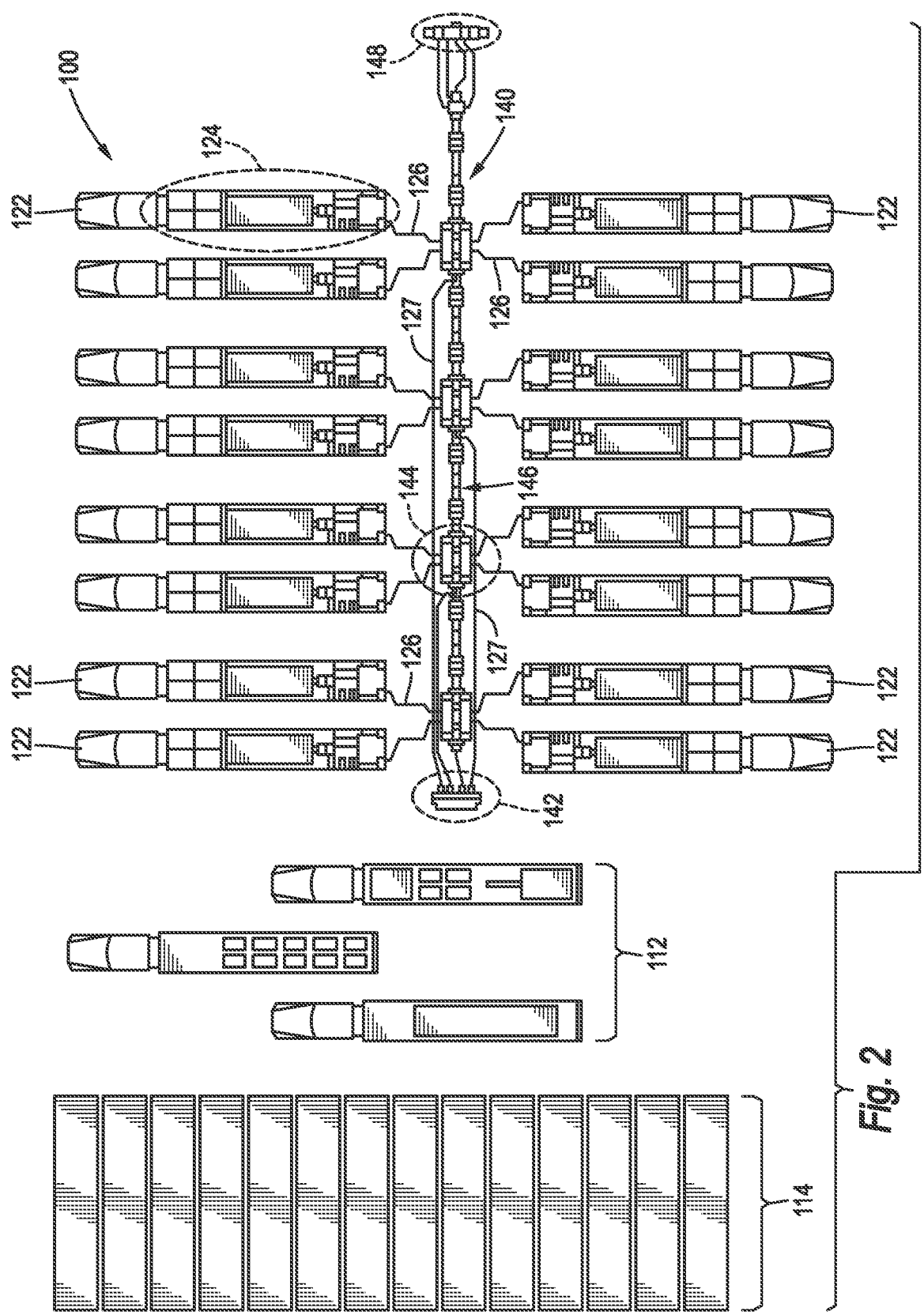
FIG. 2 is a simplistic a plan view of one illustrative embodiment of a modular system and manifolds disclosed herein for use in introducing fluids into oil and gas wells when employed in a well fracturing operation.

FIG. 2 is a plan view of one illustrative embodiment of a modular system 100 disclosed herein in the context where the system 100 is used to perform fracturing operations on a well. FIG. 2 depicts one illustrative example of how various items of equipment that are typically employed in fracturing operations may be arranged and positioned on-site when performing a fracturing operation using the novel modular system 100 disclosed herein. In general, the equipment used in hydraulic fracturing operations includes, among other things, a blender, hydration unit and chemical trailer (collectively indicated by the reference numeral 112), a plurality of proppant or sand containers (not shown), a plurality of water tanks 114, a data monitoring van (not shown) and a plurality of pump trucks 122 each of which has a schematically-depicted high-pressure frac pump 124. In the depicted example, there is a total of sixteen such pump trucks 122—eight on each side of the illustrative example of the modular manifold system 140 depicted herein. In general, the system 140 comprises a low-pressure frac fluid inlet manifold 142, a plurality of modular manifolds 144 (four of which are depicted in FIG. 2), a plurality of connecting manifold spacing spools 146 that provide fluid communication between adjacent modular manifolds 144 and a simplistically depicted oil/gas well 148. As described more fully below, each of the modular manifolds 144 comprises a high-pressure manifold 160 and a low-pressure manifold 170, both of which are mounted on a structural support frame 150.

The following is a brief high-level description of certain operational aspects of the illustrative system 100 depicted herein. During fracturing operations, the blender 112 is adapted to prepare or mix the fracturing fluid to be injected into the well 148. The blender 112 may receive a fluid, e.g., water from the water tanks 114, and various chemical additives and/or proppants/sand, and mix all of these materials together. The final fracturing fluid is provided from the blender 112 to the low-pressure frac fluid inlet manifold 142. The fracturing fluid is then supplied to the low-pressure manifold 170 (see FIG. 3) on each of the modular manifolds 144 via a dedicated low-pressure flow line 127 for each of the modular manifolds 144. The low-pressure fracturing fluid is supplied from the low-pressure manifold 170 on each of the modular manifolds 144 to four of the frac pumps 124 via various low-pressure flow lines (not shown). The frac pumps 124 are operated so as to generate a high-pressure fracturing fluid that is injected into the high-pressure manifold 160 (see FIG. 3) on each of the modular manifolds 144 via various high-pressure flow lines 126. The high-pressure fracturing fluid flows from each of the modular manifolds 144 through the connecting manifold spacing spools 146 to the high-pressure frac fluid outlet where it is injected into the well 148. More details as to the operation and structures of the various embodiments of the modular manifolds 144 and systems 140 will be disclosed more fully below.

Figure 3:
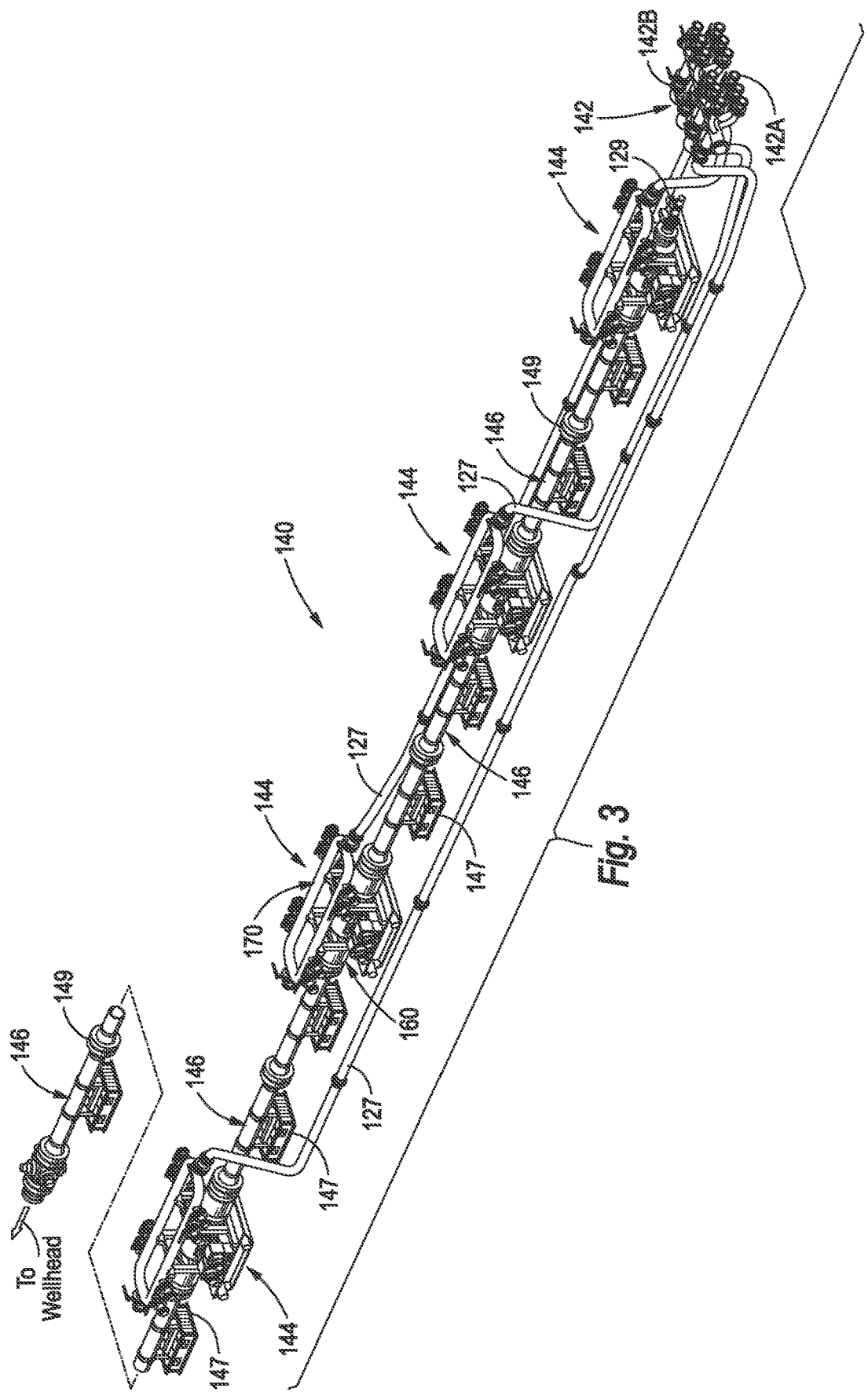
FIGS. 3 and 4 are, respectively, a perspective view and a plan view of one illustrative arrangement disclosed herein for a modular system and a plurality of modular manifolds for use in introducing fluids into oil and gas wells.
Figure 4:
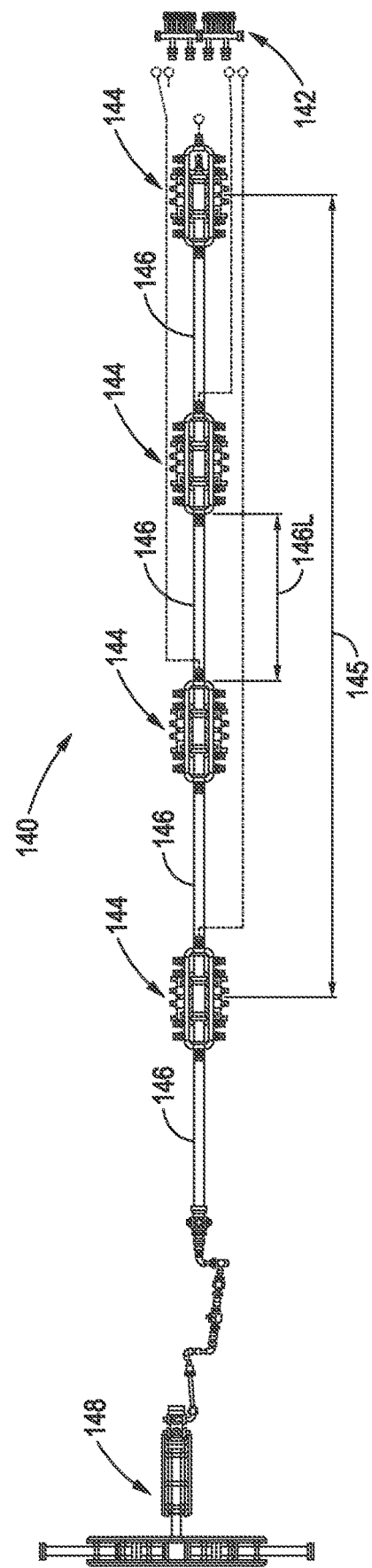
Figure 5:
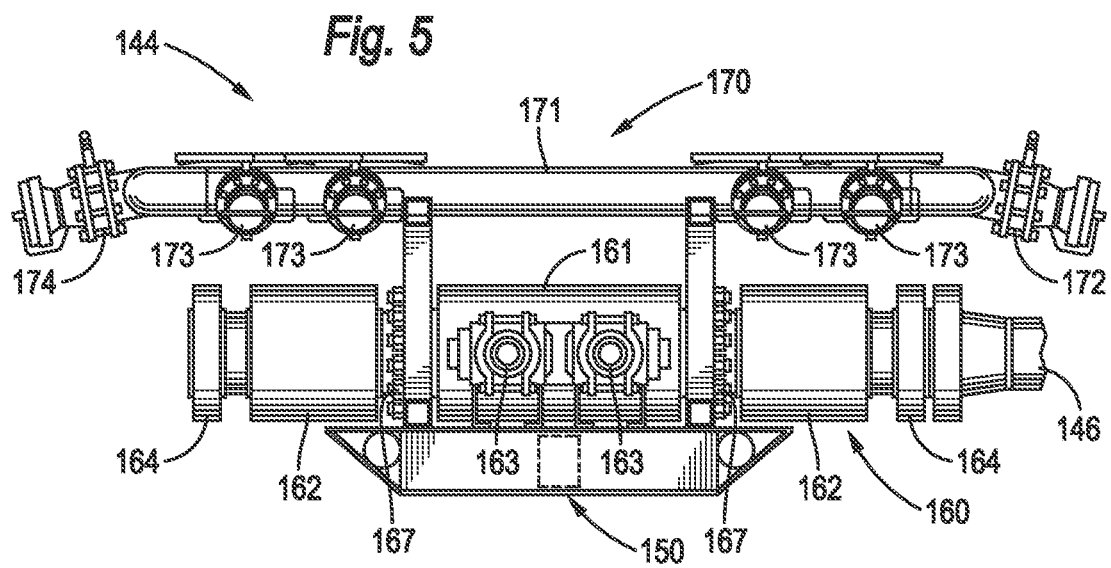
FIG. 5 is a side view of one illustrative embodiment of a modular manifold structure disclosed herein.

FIGS. 3 and 4 are, respectively, a perspective view and a plan view of one illustrative arrangement disclosed herein of a modular manifold system 140 that may be employed when injecting fluid into a well, e.g., during fracturing operations. In the examples depicted herein, the modular manifold system 140 is depicted with four illustrative modular manifolds 144, wherein each of the modular manifolds 144 is configured and adapted to be operatively connected to four illustrative pump trucks 122—with two trucks 122 being positioned on opposite sides of each of the modular manifolds 144. Of course, as will be appreciated by those skilled in the art after a complete reading of the present application, the modular manifold system 140 is very flexible in terms of how it is arranged and configured for use in a particular application. For example, each of the modular manifolds 144 could be configured to be coupled to any desired number of such pump trucks 122, e.g., two trucks 122 (one on each side of an individual modular manifold 144), four trucks 122 (two on each side of an individual modular manifold), etc. Additionally, the modular manifold system 140 may be comprised of any desired (or necessary) number of individual modular manifolds 144, as the system 140 may be extended by simply adding more modular manifolds 144 and more sections of the connecting manifold spacing spools 146.

Another aspect of the modular manifold system 140 relates to the adjustability of the overall length 145 (see FIG. 4) of the overall modular manifold system 140 for each particular fracturing job depending upon the particular application. Stated another way, if the overall length 145 of the overall modular manifold system 140 is defined as the distance 145 between the centers of the two outermost positioned modular manifolds 144 (wherein a system 140 may include any number of such manifolds 144), then the overall length 145 of the system 140 may be designed uniquely for each fracturing job by adjusting the axial lengths 146L of one or more of the connecting manifold spacing spools 146. In some applications, all of the connecting manifold spacing spools 146 in a particular system 140 for a particular job may all have the same axial length 146L, e.g., 10 feet. While, in other applications, the axial length 146L (see FIG. 4) of at last some of the connecting manifold spacing spools 146 may be different from one another, i.e., they may be individually and intentionally sized to any desired axial length 146L. As one example, the overall axial length 145 of the system 140 on a first fracturing job may be designed such that each of the connecting manifold spacing spools 146 may have the same axial length 146L (e.g., 10 feet) to produce a system 140 having a first overall length 145 for the first fracturing job. However, on a second fracturing job, the conditions may be such that the system 140 is designed to have a second overall length 145 that is different (i.e., greater or lesser) than the first overall length 145 of the system used on the first fracturing job. For example, in second fracturing job, the connecting manifold spacing spools 146 may be sized to have the same axial length 146L, wherein that axial length for the second fracturing job is, for example, 15 feet or 5 feet, so as to produce an overall length 145 for the system 140 on the second fracturing job that is, respectively, greater than and less than, the overall length 145 of the system 140 used on the first fracturing job. This permits the modular manifold system 140 to be uniquely and efficiently configured for any particular job site so as to enable the most efficient and safe positioning and arrangement of the fracturing equipment on a particular job site. Of course, the number of the modular manifolds 114 used on system 140 for a first fracturing job may be different from the number of modular manifolds 144 on a system for a second fracturing job. Additionally, in some applications, at least some of the modular manifolds 144 may be re-used on a second fracturing job while, in other applications, the modular manifolds 144 used on the two different jobs may be entirely different pieces of equipment.

As another example, if a particular job site has a particularly wet area or a low spot that may retain water, then there is a chance that the relatively heavy equipment may become stuck in mud. However, using the novel modular manifold system 140 disclosed herein, one or more of the connecting manifold spacing spools 146 may be formed to an extra-long axial length so that the adjacent modular manifolds 144 coupled to this extra-long manifold spool 146, and the associated pump trucks 122 that will be operatively coupled to the adjacent modular manifolds 144, will not be positioned in this wet area. Of course, if desired, all of the connecting manifold spacing spools 146 may be formed to the same desired axial length 146L while still using the novel modular manifolds 144 disclosed herein. It should be noted that when it is referred to herein that the connecting manifold spacing spools 146 may be formed to different axial lengths 146L, it is intended to mean that that the connecting manifold spacing spools 146 are intentionally designed to have different lengths, sometimes significantly different, and it is not intended to apply to situations where there may be relatively small or minor differences in the axial length of such components to manufacturing tolerances or the like.

With reference to FIG. 3, also depicted are a plurality of illustrative mechanical support structures 147 that are positioned where needed to mechanically support the connecting manifold spacing spools 146. Also note that, in the depicted example, each of the connecting manifold spacing spools 146 may in fact comprise a plurality of piping spools that are coupled to one another by a flanged connection 149. In other applications, the connecting manifold spacing spools 146 may be a single piping spool with flanged connections on either end for mating with corresponding flanged connections of adjacent modular manifolds 144.

As mentioned above, the low-pressure fracturing fluid is supplied from the low pressure frac fluid inlet manifold 142 to the low-pressure manifold 170 on each of the modular manifolds 144 via a dedicated low-pressure flow line 127. In the depicted example, the low pressure frac fluid inlet manifold 142 serves as a "crossover" manifold in that it has twelve inlet nozzles 142A (e.g., 4" nozzles) and four outlet nozzles (e.g., 6" nozzles). It should also be noted that the modular manifold 144 that is positioned closest to the low pressure frac fluid inlet manifold 142 will typically have a series of valves, as indicated by the reference numeral 129, operatively coupled to one end of the high-pressure manifold 160 on that particular modular manifold 144. The valves 129 may serve a variety of purposes, e.g., a connection for priming the frac pumps 124, to provide a connection point back to the blender 112, etc. Of course, the valves 129 may be removed as needed to access the flow path defined by the plurality of modular manifolds 144 and the plurality of connecting manifold spacing spools 146.

FIGS. 5-8 are various views of one illustrative embodiment of the modular manifolds 144 disclosed herein. As noted above, each of the illustrative modular manifolds 144 comprises a high-pressure manifold 160 and a low-pressure manifold 170, both of which are mounted on a structural support frame 150. The structural support frame 150 may be of any desired configuration so long as it is able to support the high-pressure manifold 160 and the low-pressure manifold 170 and all operational loads. The modular manifolds 144 depicted herein may be positioned on the ground during operation or they may be positioned on another structure, such as a flatbed trailer. The physical size of the modular manifolds 144 may vary depending upon the application. In one example, a modular manifold 144 may have a length of about 162 inches, a width of about 74 inches and a vertical height of about 54 inches. Typically, the modular manifolds 144 will be sized and configured such that they may be readily transported to the job site via trucks.

In general, the high-pressure manifold 160 and low-pressure manifold 170 may be rated for any desired pressure service and they may be comprised of components that are any desired internal diameter. For example, in one illustrative embodiment, the components of the low-pressure manifold 170 may have a pressure rating of about 175 psi, while the components of the high-pressure manifold 160 may have a pressure rating of about 15,000 psi or greater. Of course, the pressure ratings are provided by way of example only and they may vary depending upon the particular application. In one illustrative embodiment, the main piping components of the high-pressure manifold 160 and the connecting manifold spacing spools 146 may have the same internal diameter, although such a configuration is not required in all applications.

In the depicted example, the high-pressure manifold 160 comprises a high-pressure inlet cross 161 and a plurality of high-pressure spools 162 that are adapted to be coupled to the high-pressure inlet cross 161 via a flanged connection 167. The high-pressure manifold 160 further comprises a plurality of flanges 164 that are adapted to be operatively coupled to the connecting manifold spacing spools 146. The high-pressure manifold 160 further comprises a plurality of high-pressure frac fluid inlet valves 163 that are adapted to receive high-pressure frac fluid from the output of the high-pressure frac pumps 124 to thereby allow high-pressure frac fluid to be introduced into the high-pressure inlet cross 161 of the high-pressure manifold 160 on the modular manifold 144. In one illustrative embodiment, each of the high-pressure frac fluid inlet valves 163 comprises a plug valve that is adapted to be actuated so as to stop the flow of high-pressure fluid from the pumps 124 to the high-pressure inlet cross 161 in case of emergency and/or on an as needed basis. The size and number of the high-pressure frac fluid inlet valves 163 may vary depending upon the particular application. In the depicted example, the high-pressure manifold 160 is generally comprised of three components:

the high-pressure inlet cross 161 and the two high-pressure spools 162 that are removably coupled to one another via the flanged connections 167. In other embodiments, the high-pressure manifold 160 may have a one-piece unitary structure with the flanges formed on the end of that one-piece structure. In some cases, the high-pressure frac fluid inlet valves 163 may be considered to be part of the high-pressure manifold 160 as well.

The low-pressure manifold 170 generally comprises a flow distribution manifold 171, a low-pressure frac fluid inlet 172 and a plurality of low-pressure frac fluid outlets 173. In the depicted example, the low-pressure manifold 170 further comprises a blinded outlet 174 that may be opened as needed to inspect the internals of the flow distribution manifold 171. In other cases, the connection 174 may be used as the inlet for low-pressure fracturing fluid while the connection 172 may be blinded, i.e., the low-pressure manifold 170 is adapted to receive low-pressure frac fluid that flows in either direction via either the first or second connections 172 or 174.

Figure 6:
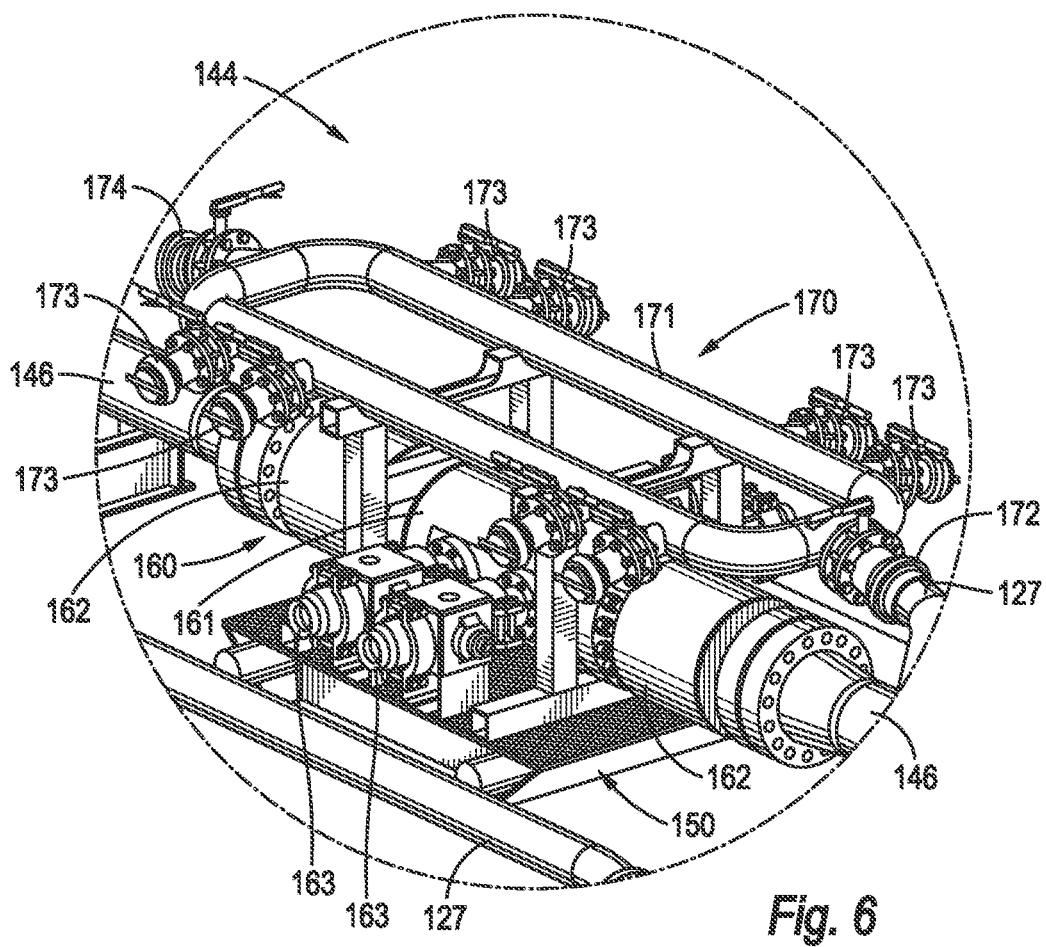
Figure 7:
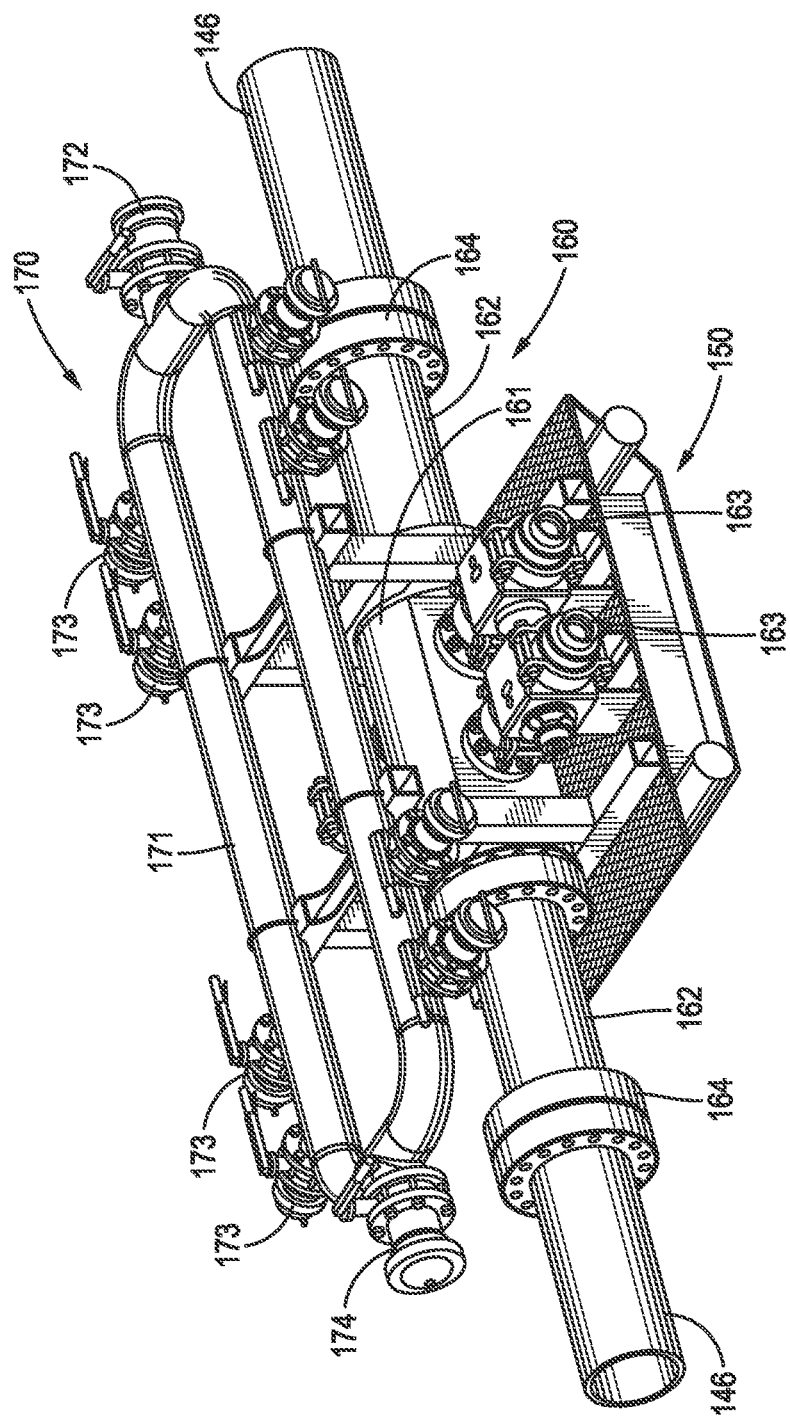
FIG. 7 is a perspective view of one illustrative embodiment of a modular manifold structure disclosed herein.

As depicted in FIG. 6, a dedicated low-pressure flow line 127 is coupled to the low-pressure frac fluid inlet 172 such that low-pressure frac fluid from the low-pressure frac fluid inlet manifold 142 may be introduced into the flow distribution manifold 171. Low-pressure frac fluid in the flow distribution manifold 171 is adapted to be supplied to the suction side of the frac pumps 124 positioned on the pump trucks 122 via the low-pressure frac fluid outlets 173 and a plurality of low-pressure flow lines (not shown) extending from the low-pressure frac fluid outlets 173 of the flow distribution manifold 171 to the pumps 124. In the depicted example, wherein each of the modular manifolds 144 is configured to be used with four illustrative trucks/pumps 122/124, the system may be configured such that there are eight of the low-pressure frac fluid outlets 173—wherein two of the low-pressure frac fluid outlets 173 are connected to one of the four illustrative pumps 124 to insure that a sufficient volume of the low-pressure fracturing fluid is supplied to the suction side of each of the pumps 124. In other applications, the system may be configured such that only a single low-pressure frac fluid outlet 173 is adapted to supply low-pressure fracturing fluid from the low-pressure manifold 170 to one of the pumps 124.

In the examples depicted herein, the low-pressure flow distribution manifold 171 is depicted as being a loop of piping with the plurality of low-pressure frac fluid outlets 173 positioned therein. In practice, the low-pressure flow distribution manifold 171 may be of any desired configuration, e.g. a box-like structure with the low-pressure frac fluid outlets 173 positioned therein or a single section of piping with the plurality of low-pressure frac fluid outlets 173 positioned therein. In another embodiment, the flow distribution manifold 171 may take the form of a relatively large diameter pipe with the plurality of low-pressure frac fluid outlets 173 positioned therein. Thus, the particular configuration of the flow distribution manifold 171 of the low-pressure manifold 170, as well and the physical size of the flow distribution manifold 171 should not considered to be a limitation of the subject matter disclosed herein, unless such limitations are expressly recited in any claim.

In one illustrative embodiment, the low-pressure manifold 170 is a dedicated and independent low-pressure manifold in that it is adapted to supply low-pressure fracturing fluid only to frac pumps 124 that are operatively coupled to the high-pressure manifold 160 of the particular modular manifold 144 of which the dedicated and independent low-pressure manifold 170 is a component. That is, in the depicted example, the low-pressure manifolds 170 on each of the modular manifolds 144 are not in fluid communication with one another via any interconnecting piping or that like where necessary volumes of fracturing fluid may be supplied to the manifolds 170 (considered collectively) to perform a fracturing process. In the depicted example, each of the dedicated and independent low-pressure manifolds 170 receives low-pressure fracturing fluid only from a dedicated low-pressure flow line 127 that is coupled to the low-pressure frac fluid inlet manifold 142.

Figure 8:
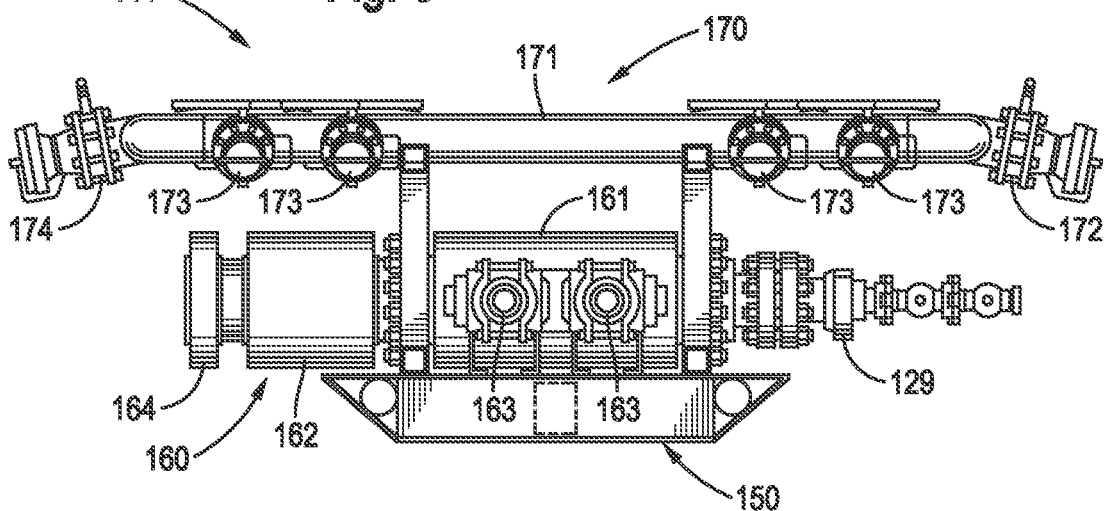
FIG. 8 is a perspective view of another illustrative embodiment of a modular manifold structure disclosed herein.
Figure 9:
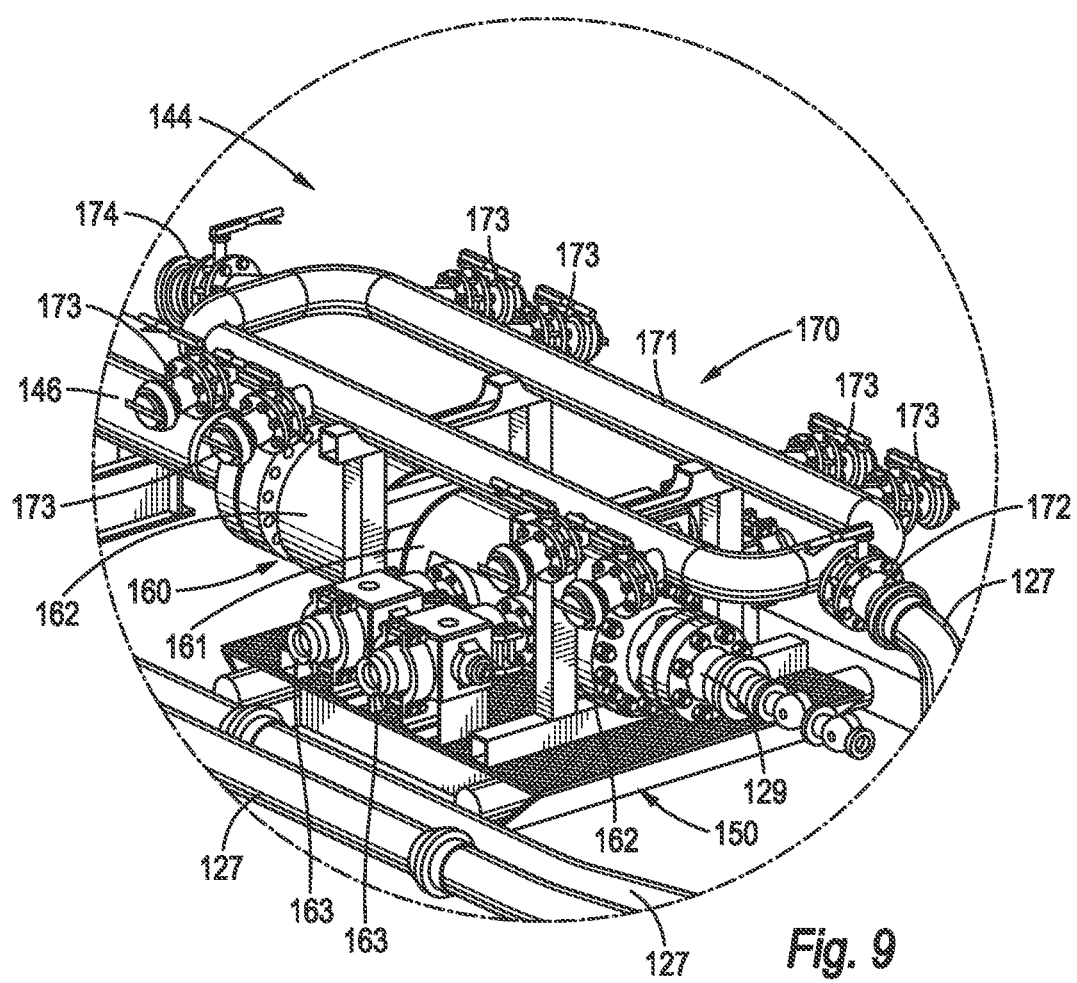
FIG. 9 is a side view of another illustrative embodiment of a modular manifold structure disclosed herein.

FIGS. 8 and 9 are various views of one illustrative embodiment of a modular manifold 144 disclosed herein. In general, FIGS. 8 and 9 depict an example of the modular manifold 144 that is positioned closest to the low pressure frac fluid inlet manifold 142 (see FIG. 3) wherein the above-described series of valves, as indicated by the reference numeral 129, are operatively coupled to one end of the high-pressure manifold 160 on that particular modular manifold 144. Other than that one difference, all of the modular manifolds 144 have the same basic configuration and components.

Figure 10:
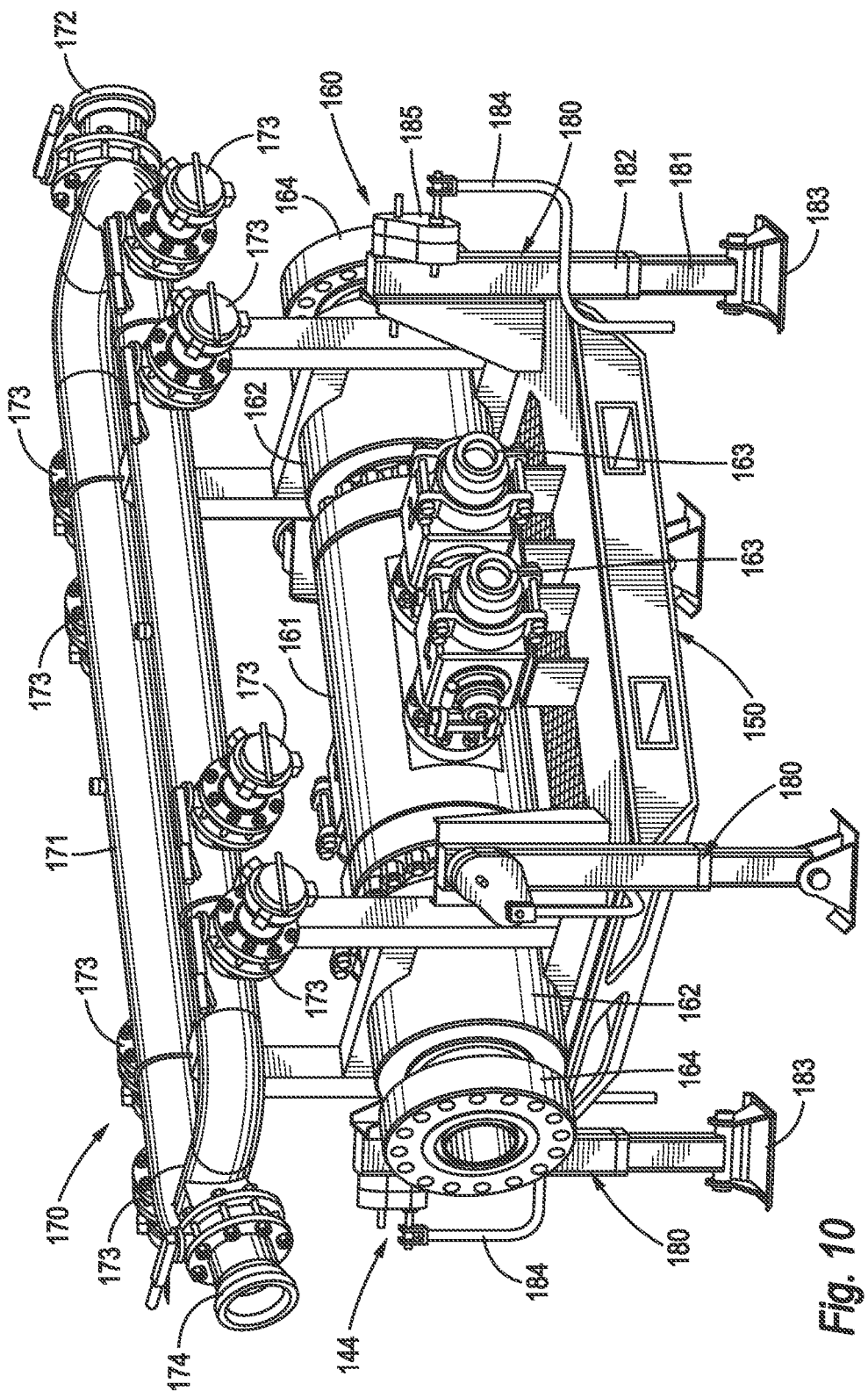
FIG. 10 is a perspective view of the illustrative modular manifold structure shown in FIG. 9.

FIG. 10 depicts a further illustrative example of a novel modular manifold 144 disclosed herein. In this example, the modular manifold 144 comprises a plurality of height-adjustable support legs 180 that are coupled to the support structure 150. In the depicted example, there are four of the height-adjustable support legs 180 coupled to the support structure 150. However, depending upon the particular application, a greater or lesser number of the height-adjustable support legs 180 may be employed depending upon the design and configuration of any particular modular manifold 144. In the depicted example, the height-adjustable support legs 180 comprise an inner structural member 181 that is adapted to telescope into and out of an outer structural member 182. In the depicted example, the lower end of the inner structural member 181 is pivotally coupled to a foot support 183. The length of the height-adjustable support legs 180 may be adjusted by rotation of a handle 184 that drives a gear box 185 that is operatively coupled (via various mechanical structures) to the inner structural member 181 such that rotation of the handle causes the inner structural member 181 to retract into or extend outwardly from the outer structural member 182.

Providing such height-adjustable support legs 180 on a modular manifold 144 may be beneficial for several reasons. First, the presence of the height-adjustable support legs 180 permits the modular manifold 144 to be positioned directly on the ground as opposed to simply positioning a manifold, such as the frac manifold 20, on the upper surface of a flatbed trailer. By positioning the modular manifold 144 disclosed herein on the ground, it is more readily accessible to on-site personnel and there is more room for tools and other equipment adjacent the ground-positioned modular manifold 144 as contrasted with the relatively limited workspace available when a manifold is positioned on a flatbed trailer. As a specific example, by positioning the modular manifold 144 on the ground, a worker will not have to first climb onto the flatbed trailer to begin working on the modular manifold 144. Additionally, the height-adjustable support legs 180 may be employed as alignment aids in assembling the modular manifolds 144 and the connecting manifold spacing spools 146 by providing a mechanism to make needed height adjustments and/or tilt adjustments to facilitate making up the various flanged connections in the system 100. The height-adjustable support legs 180 also permit the modular manifold 144 to be positioned on relatively uneven surfaces as each of the height-adjustable support legs 180 are individually adjustable. Other advantages to the use of such height-adjustable support legs 180 will be readily apparent to those skilled in the art after a complete reading of the present application.

As will be appreciated by those skilled in the art after a complete reading of the present application, the use of the terms "high-pressure" and "low-pressure," e.g., as in "high-pressure manifold" and "low-pressure manifold," is intended to only be descriptive of the component and their position within the systems disclosed herein. That is, the use of such terms should not be understood to imply that there is a specific operating pressure or pressure rating for such components. For example, the term "high pressure manifold" should be understood to refer to a manifold that receives pressurized fracturing fluid that has been discharged from a frac pump irrespective of the actual pressure of the fracturing fluid as it leaves the pump or enters the manifold. Similarly, the term "low-pressure manifold" should be understood to refer to a manifold that receives fracturing fluid and supplies that fluid to the suction side of the frac pump irrespective of the actual pressure of the fluid within the low-pressure manifold.

The particular embodiments disclosed above are illustrative only, as the disclosed subject matter may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the claimed subject matter. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A system, the system comprising:
   a first modular manifold, the first modular manifold comprising:
     a first low-pressure manifold configured to supply fracturing fluid to a suction side of a first frac pump; and
     a first high-pressure manifold configured to receive a fracturing fluid discharged from the first frac pump;
   a frac fluid inlet manifold separate from the first modular manifold;
   a first dedicated low-pressure line providing fluid communication only between the frac fluid inlet manifold and the first low-pressure manifold;
   a second modular manifold operatively coupled to the first modular manifold, the second modular manifold comprising:
     a second low-pressure manifold configured to supply fracturing fluid to a suction side of a second frac pump; and
     a second high-pressure manifold configured to receive a fracturing fluid discharged from the second frac pump; and
   a second dedicated low-pressure line providing fluid communication only between the frac fluid inlet manifold and the second low-pressure manifold.

2. The system of claim 1, wherein the first frac pump is disposed on a frac truck adjacent to the first modular manifold.

3. The system of claim 2, further comprising at least another frac truck adjacent to the first modular manifold, the at least another frac truck having an another frac pump.

4. The system of claim 1, further comprising:
   a third modular manifold operatively coupled to the second modular manifold, the third modular manifold comprising:
     a third low-pressure manifold configured to supply fracturing fluid to a suction side of a third frac pump; and
     a third high-pressure manifold configured to receive a fracturing fluid discharged from the third frac pump; and
   a third dedicated low-pressure line providing fluid communication only between the frac fluid inlet manifold and the third low-pressure manifold.

5. The system of claim 4, further comprising a plurality of connecting manifold spacing spools configured to provide fluid communication, via a flanged connection, between the first modular manifold, the second modular manifold, and the third modular manifold.

6. The system of claim 4, further comprising at least one valve coupled to an end of one of the first high-pressure manifold, the second high-pressure manifold, or the third high-pressure manifold.

7. The system of claim 1, wherein the frac fluid inlet manifold comprises a plurality of inlet nozzles and a plurality of outlet nozzles, wherein at least one the plurality of outlet nozzles is coupled to the first dedicated low-pressure line.

8. A modular manifold, the modular manifold comprising:
   a low-pressure manifold configured to supply fracturing fluid to a suction side of no more than four frac pumps;
   a high-pressure manifold configured to receive a fracturing fluid discharged from the no more than four frac pumps,
   wherein the low-pressure manifold is in a closed loop;
   a dedicated low-pressure line providing fluid communication only between the low-pressure manifold and a frac fluid inlet manifold, wherein the frac fluid inlet manifold is separate from the low-pressure manifold,
   wherein the high-pressure manifold comprises:
     a high-pressure inlet cross;
     a plurality of high-pressure spools configured to be coupled to the high-pressure inlet cross; and
     a plurality of high-pressure frac fluid inlet valves configured to receive the discharged fracturing fluid to thereby allow the discharged fracturing fluid to be introduced into the high-pressure inlet cross.

9. The modular manifold of claim 8, wherein each frac pump of the no more than four frac pumps is disposed on a frac truck.

10. The modular manifold of claim 9, wherein no more than two frac trucks are adjacent to one side of the modular manifold.

11. The modular manifold of claim 8, wherein the low-pressure manifold comprises:
   a flow distribution manifold configured to supply the fracturing fluid to the suction side via a plurality of low-pressure frac fluid outlets; and a blinded outlet configured to allow access to an internal of the flow distribution manifold.

12. A system, the system comprising:
a first modular manifold, the first modular manifold comprising:
  a first low-pressure manifold configured to supply fracturing fluid to a suction side of a first frac pump; and
  a first high-pressure manifold configured to receive a fracturing fluid discharged from the first frac pump;
a frac fluid inlet manifold separate from the first modular manifold; and
a first dedicated low-pressure line providing fluid communication only between the frac fluid inlet manifold and the first low-pressure manifold,
wherein the frac fluid inlet manifold comprises a plurality of inlet nozzles and a plurality of outlet nozzles, wherein at least one the plurality of outlet nozzles is coupled to the first dedicated low-pressure line.

13. The system of claim 12, further comprising a series of valves operatively coupled to the first high-pressure manifold, wherein the series of valves provide a connection for priming the first frac pump.

14. The system of claim 13, wherein the series of valves provide a connection point to a blender.

15. The system of claim 12, further comprising:
a second modular manifold operatively coupled to the first modular manifold, the second modular manifold comprising:
  a second low-pressure manifold configured to supply fracturing fluid to a suction side of a second frac pump; and
  a second high-pressure manifold configured to receive a fracturing fluid discharged from the second frac pump; and
a second dedicated low-pressure line providing fluid communication only between the frac fluid inlet manifold and the second low-pressure manifold.

16. The system of claim 15, further comprising:
a third modular manifold operatively coupled to the second modular manifold, the third modular manifold comprising:
  a third low-pressure manifold configured to supply fracturing fluid to a suction side of a third frac pump; and
  a third high-pressure manifold configured to receive a fracturing fluid discharged from the third frac pump; and
a third dedicated low-pressure line providing fluid communication only between the frac fluid inlet manifold and the third low-pressure manifold.

17. The system of claim 16, further comprising a plurality of connecting manifold spacing spools configured to provide fluid communication, via a flanged connection, between the first modular manifold, the second modular manifold, and the third modular manifold.

18. The system of claim 12, wherein the first low-pressure manifold comprises a flow distribution manifold to receive fluids from the frac fluid inlet manifold via the first dedicated low-pressure line.

* * * * *